(12) United States Patent
Liang et al.

(10) Patent No.: US 6,445,095 B1
(45) Date of Patent: Sep. 3, 2002

(54) ELECTRIC MACHINE WITH LAMINATED COOLING RINGS

(75) Inventors: Feng Liang, Canton; John Michael Miller, Saline, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/758,871

(22) Filed: Jan. 11, 2001

(51) Int. Cl.[7] .............................. H02K 9/00; H02K 1/04
(52) U.S. Cl. .............................. 310/64; 310/91; 310/43; 310/217
(58) Field of Search .................. 310/58, 43, 59, 310/60 R, 64, 254, 216, 42, 259, 45; 29/596, 606

(56) References Cited

U.S. PATENT DOCUMENTS

| | | | |
|---|---|---|---|
| 3,688,137 A | | 8/1972 | Filhol |
| 4,492,884 A | * | 1/1985 | Asano et al. ............... 310/45 |
| 4,634,908 A | | 1/1987 | Sturm |
| 4,745,314 A | * | 5/1988 | Nakano ..................... 310/57 |
| 4,864,176 A | * | 9/1989 | Miller et al. ............... 310/194 |
| 4,963,776 A | | 10/1990 | Kitamura |
| 5,053,658 A | | 10/1991 | Fakler et al. |
| 6,043,583 A | * | 3/2000 | Kurosawa et al. .......... 310/254 |
| 6,201,321 B1 | * | 3/2001 | Mosciatti et al. ........... 310/43 |

* cited by examiner

*Primary Examiner*—Tran Nguyen

(57) ABSTRACT

An electric machine in accordance with the invention includes a stator core having first and second ends and having windings therein with end turns of the windings protruding from the first and second ends of the stator core. A rotor is rotatably positioned within the stator core. First and second laminated aluminum ring assemblies are positioned against the first and second ends, respectively, of the stator core in contact with the housing. Thermally conductive potting material is positioned between the end turns and the respective first and second ring assembly at the first and second ends of the stator core, thereby creating heat dissipation paths from the end turns, through the potting material and the ring assemblies to the housing.

8 Claims, 1 Drawing Sheet

ELECTRIC MACHINE WITH LAMINATED COOLING RINGS

BACKGROUND OF THE INVENTION

1. Field of the Invention

The present invention relates to an electric machine having laminated cooling rings adjacent end turns of the stator core windings for transferring heat from the windings to the housing.

2. Background Art

The cooling of stator windings of electric machines is critical for providing satisfactory motor performance, reliability and durability. This issue becomes even more pressing when the motor is required to have a high power density ($kW/m^3$) and low specific weight. An integrated starter/alternator is a good example where the electric motor is required to have high power density, low specific weight, and good cooling capability because of packaging constraints, fuel economy requirements, and the fact that the motor is in the engine compartment.

Thermally conductive epoxy potting materials have been applied on the end turn windings to improve the cooling of an electric motor. FIG. 1 shows a prior art motor 10 having such a feature. As shown, the motor 10 consists of a rotatable rotor 12 rotatably positioned within a stator core 14. The stator core 14 has first and second ends 16,18 with end turns 20,22 of the windings extending from the ends 16,18, respectively. A housing 24 having end plates 26,28 encloses the stator core, windings and rotor. A thermally conductive potting material 30 is positioned over each of the end turns 20,22 for carrying heat directly from the end turns 20,22 to the housing 24 for heat dissipation.

This potting technology provides limited value because the potting material has a fairly high thermal resistance, which limits the heat dissipation capacity. Additionally, the cooling potential of the potting material cannot be fully utilized because of gaps which are developed between the potting material and the winding, and between the potting material and the housing as a result of thermal cycling of the motor. The reason for the gap development is that the potting material, the winding and the housing have different thermal expansion coefficients. The gaps are filled with air, which provides minimal thermal conductivity.

Accordingly, it is desirable to provide an improved method and apparatus for cooling an electric machine.

SUMMARY OF THE INVENTION

The present invention improves upon the above-described prior art cooling method by providing two laminated aluminum ring assemblies at the opposing ends of the stator core which are embedded within the potting material. The laminated aluminum rings substantially enhance heat dissipation, while the laminations reduce eddy current buildup within the rings.

In a preferred embodiment, each lamination of the rings has a plurality of radially extending slots which provide air gaps to minimize eddy currents in a plane perpendicular to the central axis of the motor.

More specifically, the present invention provides an electric machine including a stator core having first and second ends and having windings therein with end turns of the windings protruding from the first and second ends of the stator core. A rotor is rotatably positioned within the stator core. First and second laminated aluminum ring assemblies are positioned against the first and second ends, respectively, of the stator core in contact with the housing. Thermally conductive potting material is positioned between the end turns and the respective first and second ring assembly at the first and second ends of the stator core, thereby creating heat dissipation paths from the end turns, through the potting material and the ring assemblies to the housing.

Accordingly, an object of the invention is to provide an improved method and apparatus for cooling an electric machine wherein laminated aluminum ring assemblies are provided at opposing ends of the stator core for dissipating heat through a potting material from the end turns of the windings.

The above object and other objects, features and advantages of the invention are readily apparent from the following detailed description of the best mode for carrying out the invention when taken in connection with the accompanying drawings.

DETAILED DESCRIPTION OF THE PREFERRED EMBODIMENT(S)

Figure 1:
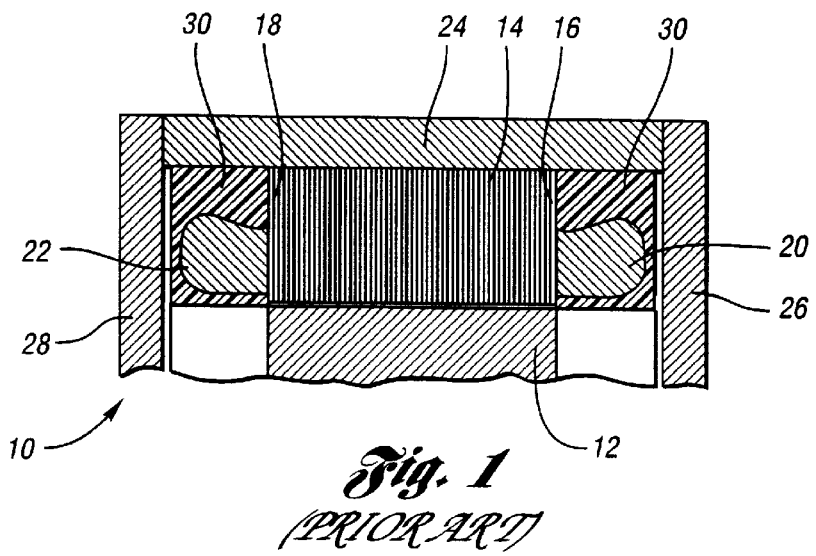
FIG. 1 shows a schematically arranged partially cut-away vertical cross-sectional view of a prior art electric motor.
Figure 2:
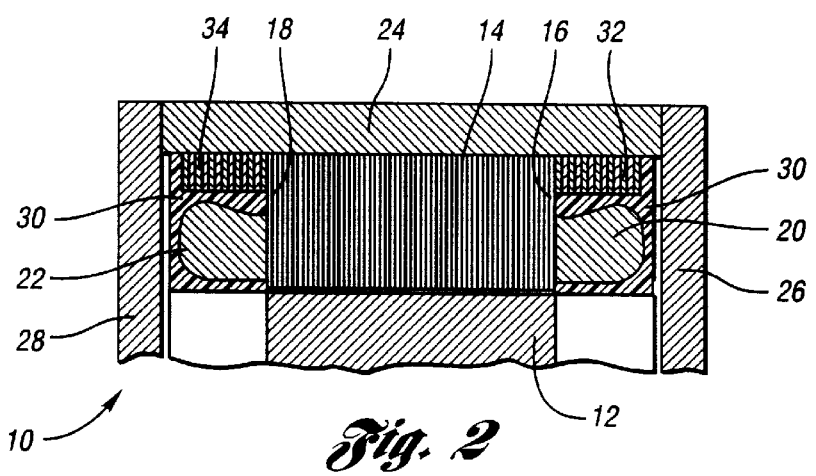
FIG. 2 shows a schematically arranged partially cut-away vertical cross-sectional view of an electric motor in accordance with the present invention.

The present invention will now be described with reference to FIG. 2, wherein like reference numerals will be used to describe like components as described previously with respect to FIG. 1.

As shown, the present invention provides an electric machine 10 including a rotor 12 rotatably positioned within a stator core 14. The stator core 14 has first and second opposing ends 16,18 with end turns 20,22 of the stator core windings protruding from the respective ends 16,18. A housing 24 includes first and second end plates 26,28, which enclose the stator and rotor assembly.

A potting material 30 is positioned around the first and second end turns 20,22 of the windings. First and second laminated aluminum rings 32,34 are positioned at the first and second ends 16,18, respectively, of the stator core 14 in contact with the housing 24 for carrying heat from the end turns 20,22 through the potting material 30, through the laminated aluminum rings 32,34 to the housing 24.

The housing 24 may be liquid cooled or air cooled, using configurations that are well known in the art.

Figure 3:
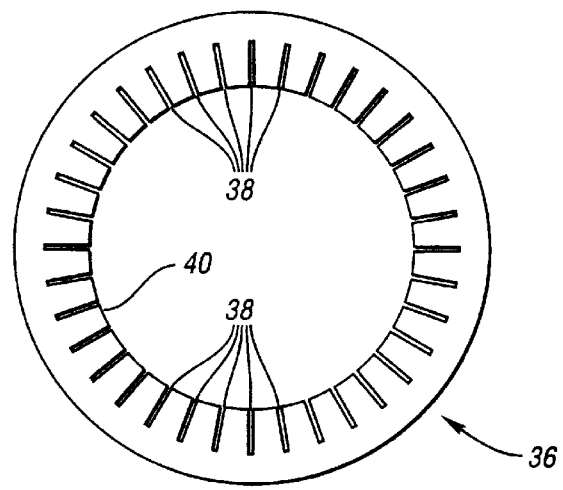
FIG. 3 shows a plan view of a ring for use with the ring assemblies shown in FIG. 2.

The laminations of the laminated aluminum ring assemblies 32,34 are insulated to reduce eddy current losses. Additionally, because the magnetic fields around the end turn windings 20,22 are three-dimensional in nature, the invention also contemplates providing slots in the laminated aluminum rings extending radially, as shown in FIG. 3, to further reduce the eddy current in the rings. As shown in FIG. 3, each lamination (ring) 36 of the laminated ring assemblies 32,34 is provided with a plurality of radially extending slots 38 extending from the annular inner edge 40 of each lamination 36. These slots 38 extend approximately one-half the width of each ring 36 to reduce eddy currents in a plane perpendicular to a central axis of the electric machine.

The present invention significantly improves cooling capability over the above-described prior art methods.

Because the aluminum of the ring assemblies has much higher thermal conductivity than the potting material (about 300 times higher), this invention has much better cooling capability, and as a result, the winding temperature will be significantly lower.

The potential of this cooling method is fully utilized because there will not be any gaps developed between the winding and the layer of potting material and between the ring and the potting material. The reason is that a flexible potting material 30 can be used. Even though the flexible potting material has higher thermal resistance than the non-flexible potting material, the total thermal resistance from the windings to the housing is still much lower than that of the existing potting technology. This is because the potting material is minimized in thickness. The existing potting technology must use a non-flexible potting material, which has a lower thermal resistance than the flexible one, for the thermal resistance reason because of the thickness of the potting material layer.

Another advantage of the present invention is that motor efficiency will be improved. Since the invention can lower the winding temperature significantly, the copper loss in the winding will be reduced significantly because lower temperature leads to lower winding resistance.

The aluminum rings potted to the end windings also improves the stiffness of the electric machine.

This invention has a wide range of applications. It can be used for any variety of electric machines, but has particular applicability in the auto industry because the auto industry typically provides harsh thermal operating conditions. For example, the invention can be used in traction motors for fuel cell EV, pure EV and hybrid EV (electric vehicle). Also, an integrated starter/alternator or high output alternator are good applications. The simplicity of the design makes the invention very easy to implement.

While the best mode for carrying out the invention has been described in detail, those familiar with the art to which this invention relates will recognize various alternative designs and embodiments for practicing the invention within the scope of the appended claims.

What is claimed is:

1. An electric machine comprising:
   a stator core having first and second ends and having windings therein with end turns of the windings protruding from the first and second ends of the stator core;
   a rotor rotatably positioned within the stator core;
   first and second laminated aluminum rig assemblies positioned against the first and second ends, respectively, of the stator core and contacting the housing, wherein said first and second ring assemblies are positioned radially outwardly from the respective end turns;
   thermally conductive potting material positioned between the end turns and the respective first and second ring assembly at the first and second ends of the stator core, thereby creating heat dissipation paths from the end turns, through the potting material and the ring assemblies to the housing.

2. The electric machine of claim 1, wherein said first and second laminated aluminum ring assemblies each comprise a plurality of aluminum laminations, each said aluminum lamination having a plurality of radial slots formed therein to reduce eddy current losses in each ring assembly.

3. The electric machine of claim 2, wherein each lamination of said aluminum rings is insulated to further reduce eddy current losses in each ring assembly.

4. An electric machine comprising:
   a stator core having first and second ends and having windings therein with end turns of the windings protruding from the first and second ends of the stator core;
   a rotor rotatably positioned within the stator core;
   first and second laminated aluminum ring assemblies positioned against the first and second ends, respectively, of the stator core and contacting the housing, wherein said first and second laminated aluminum ring assemblies each comprise a plurality of aluminum laminations, each said aluminum lamination having a plurality of radial slots formed therein to reduce eddy current losses in each ring assembly;
   wherein said plurality of radial slots extend radially outward from an annular inner edge of each said aluminum ring at a predetermined distance to reduce eddy currents in a plane perpendicular to a central axis of the electric machine; and
   thermally conductive potting material positioned between the end turns and the respective first and second ring assembly at the first and second ends of the stator core, thereby creating heat dissipation paths from the end turns, through the potting material and the ring assemblies to the housing.

5. An electric machine comprising:
   a stator core having first and second ends and having windings therein with end turns of the windings protruding from the first and second ends of the stator core;
   a rotor rotatably positioned within the stator core;
   first and second laminated aluminum ring assemblies positioned against the first and second ends, respectively, of the stator core and contacting the housing, wherein said first and second ring assemblies are positioned radially outwardly from the respective end urns; and
   thermally conductive potting material positioned between the end turns and the respective first and second ring assembly at the first and second ends of the stator core, thereby creating heat dissipation paths from the end turns, through the potting material and the ring assemblies to the housing, wherein said first and second laminated aluminum ring assemblies each comprise a plurality of aluminum laminations, each said aluminum lamination having a plurality of radial slots formed therein to reduce eddy current losses in each ring assembly.

6. The electric machine of claim 5 wherein each lamination of said aluminum rings is insulated to further reduce eddy current losses in each ring assembly.

7. The electric machine of claim 5, wherein said thermally conductive potting material is flexible to accommodate for thermal expansion of various components of the electric machine.

8. An electric machine comprising:
   a stator core having first and second ends and having windings therein with end turns of the windings protruding from the first and second ends of the stator core;
   a rotor rotatably positioned within the stator core;
   first and second laminated aluminum ring assemblies positioned against the first and second ends, respectively, of the stator core and contacting the housing; and
   thermally conductive potting material positioned between the end turns and the respective first and second ring assembly at the first and second ends of the stator core, thereby creating heat dissipation paths from the end turns, through the potting material and the ring assemblies to the housing, wherein said first and second laminated aluminum ring assemblies each comprise a plurality of aluminum laminations, each said aluminum lamination having a plurality of radial slots formed therein to reduce eddy current losses in each ring assembly, wherein said plurality of radial slots extend radially outward from an annular inner edge of each said aluminum lamination at a predetermined distance to reduce eddy currents in a plane perpendicular to a central axis of the electric machine.

* * * * *